United States Patent [19]

Denes

[11] 3,918,047

[45] Nov. 4, 1975

[54] DECODING CIRCUIT FOR VARIABLE LENGTH CODES

[75] Inventor: Peter Bernard Denes, Gillette, N.J.

[73] Assignee: Bell Telephone Laboratories, Incorporated, Murray Hill, N.J.

[22] Filed: Mar. 28, 1974

[21] Appl. No.: 455,785

[52] U.S. Cl. .......... 340/347 DD

[51] Int. Cl.$^2$ .......... H03K 13/24

[58] Field of Search ...... 340/347 DD, 172.5, 147 T; 178/DIG. 3; 235/154

[56] References Cited

UNITED STATES PATENTS

| | | | |
|---|---|---|---|
| 3,634,855 | 1/1972 | Miller | 340/347 DD |
| 3,675,211 | 7/1972 | Raviv | 340/172.5 |
| 3,694,813 | 9/1972 | Loh | 340/172.5 |
| 3,701,108 | 10/1972 | Loh | 340/172.5 |
| 3,717,851 | 2/1973 | Cocke | 340/172.5 |
| 3,835,467 | 9/1974 | Woodrum | 340/347 DD |

*Primary Examiner*—Charles D. Miller
*Attorney, Agent, or Firm*—W. Ryan

[57] ABSTRACT

A tree-structured network of substantially similar logic modules is used to decode butted variable-length code words. Bits of a fixed-length sample from a bit stream sample, which sample has length equal to the maximum allowed code word length, are applied in parallel to respective rows of the tree. When the codes have the prefix property, it is assured that only one row will generate an output at a terminal node. This output uniquely identifies the decoded symbol and, by virtue of its position in the tree, indicates the associated code word length and, therefore, the beginning point for the next code word.

5 Claims, 5 Drawing Figures

DECODING CIRCUIT FOR VARIABLE LENGTH CODES

BACKGROUND OF THE INVENTION

1. Field of the Invention

The present invention relates to apparatus for decoding variable-length codes. More particularly, the present invention relates to apparatus for decoding variable-length codes with the so-called prefix property.

2. Background and Prior Art

The use of digital data processing, transmission and storage facilities has long indicated a need for efficient binary codes for representing normal data processing information such as alphanumeric characters and various graphic entities. The use of so-called statistical coding techniques, using short codes for common symbols and the converse, has proceeded from the largely intuitive Morse codes to the optimum or minimum-redundancy codes described in D. A. Huffman, "A Method for the Construction of Minimum-Redundancy Codes," *Proc. of IRE*, Vol. 40, pp. 1098–1101, September 1952. Other variable length codes have been described in E. N. Gilbert and E. F. Moore, "Variable-Length Binary Encoding," *Bell System Technical Journal*, Vol. 38, pp. 933–967, July 1959; J. B. Connell, "A Huffman-Shannon-Fano Code," *Proc. IEEE*, July 1973, pp. 1046–1047; U.S. Pat. Nos. 3,016,527 issued Jan. 9, 1962 to E. N. Gilbert et al, 3,716,851 issued Feb. 13, 1973 to P. G. Neumann, and 3,051,940 issued in Aug. 1962 to W. O. Fleckenstein. An important aspect of many prior art variable length codes, including the Huffman codes, is the fact that shorter codes are arranged to not be identical to the beginning of any longer codes; this is the prefix property.

Despite the abundance of theoretical work on minimum-redundancy codes and other prefix codes, there has been relatively little practical use made of such codes. The opinion has often been voiced that it is difficult to construct circuits to encipher or decipher variable length codes. See, for example, Brooks, F. P., Ph.D thesis, Harvard University, May 1956, and "Multi-case Binary Codes for Non-Uniform Character Distributions," *IRE Conv. Rec.*, 1957, Part. 2, P. 63. Where variable length codes have been used it has been suggested that the decoding of such sequences is especially difficult. See, for example, F. M. Ingels, *Information and Coding Theory*, Intext Educational Publishers, Scranton, Pa., 1971, pp. 127–132 and Gallager, *Information Theory and Reliable Communication*, Wiley, 1968.

It will be noted from the above-cited references and from Fano, *Transmission of Information*, John Wiley and Sons, Inc., New York, 1961, pp. 75–81, that the Huffman encoding procedure may be likened to a tree generation process where codes corresponding to less frequently occurring symbols appear at the upper extremities of a tree having several levels, while those having relatively high probability occur at lower levels in the tree. While it may appear intuitively obvious that a decoding process should be readily implied by the Huffman encoding scheme, such has not been the common experience. Many workers in the coding fields have found Huffman decoding quite intractable. See, for example, Bradley, "Data Compression for Image Storage and Transmission," *Digest of Papers, IDEA Symposium*, Society for Information Display, 1970; and O'Neal, "The Use of Entropy Coding in Speech and Television Differential PCM Systems," AFOSR-TR-72-0795, distributed by the National Technical Information Service, Springfield, Va., 1971. In those cases where Huffman decoding has been accomplished, the complexity has been clearly recognized.

When such Huffman decoding is required, it has usually been accomplished by a tree searching technique in accordance with a serially received bit stream. Thus by taking one or two branches at each node in a tree depending on which of two values is detected for individual digits in the received code, one ultimately arrives at an indication of the symbol represented by the serial code. This can be seen to be equivalent in a practical hardware implementation to the transferring to either of two locations from a given starting location for each bit of a binary input stream; the process is therefore a sequential one.

Similar tree searching operations are described in U.S. Pat. No. 3,700,819 issued Oct. 24, 1972 to M. J. Marcus; E. H. Sussenguth, Jr., "Use of Tree Structures for Processing Files," *Comm. ACM* 6,5, May 1963, pp. 272–279; and H. A. Clampett, Jr., "Randomized Binary Searching with Tree Structures," *Comm. ACM* 7,3 March 1964, pp. 163–165.

It is therefore an object of the present invention to provide a decoding arrangement for information coded in the form of variable-length prefix codes inluding, minimum-redundancy Huffman codes, without requiring a sequential decoding process.

As noted, the above-mentioned tree techniques are equivalent to transferring sequentially from location to location in a memory to arrive at a final location containing information used to encode or decode a particular symbol or signal sequence. Such sequential transfers from position to position in a memory structure is wasteful of time, and in some cases, precludes the use of minimum-redundancy codes.

It is therefore a further object of the present invention to provide apparatus and methods for providing for the parallel decoding of variable-length minimum-redundancy codes.

In a copending U.S. patent application by A. J. Frank, Ser. No. 455,668, filed of even date herewith, entitled "Uniform Decoding of Minimum-Redundancy Codes," a table look-up procedure is employed which avoids many of the shortcomings of the previously used binary search techniques. The Frank technique, while fast and useful in many contexts, nevertheless requires the use of one or more stored tables.

It is therefore a further object of the present invention to provide for the decoding of variable length prefix code words without the need for extensive storage facilities.

SUMMARY OF THE INVENTION

A preferred embodiment of the present invention comprises an array of substantially similar fundamental logic circuit modules interconnected in a pattern corresponding to a tree representation of the code. These modules are, therefore, positioned in hierarchical relation to each other in rows corresponding to bit positions of the allowed code words. Accordingly, there are M rows in correspondence to a maximum code word length of M bits.

The input data stream comprising butted-together code words are sampled in M-bit bytes, with each bit being applied to each module in the corresponding row. By virtue of the prefix property of the class of variable-length codes considered, one, and only one, of the terminal nodes in the array will experience an output signal. This signal uniquely identifies the symbol represented by the current code word, as well as its length. The decoded signal is conveniently delivered to a utilization device and the row identificatiotn is used to advance the input data stream by a number of bits equal to the row number, i.e., to the length of the just-processed code word. The process is then repeated for each succeeding code word.

DETAILED DESCRIPTION

Although Huffman minimum-redundancy codes will be used by way of example to illustrate the operation of the present invention, other variable length prefix codes may also be used, as will appear below. As noted above, the term "prefix code," of course, means that no short code word shall be identical to the beginning (prefix) of another longer code word.

Figures 1, 3A, 3B:
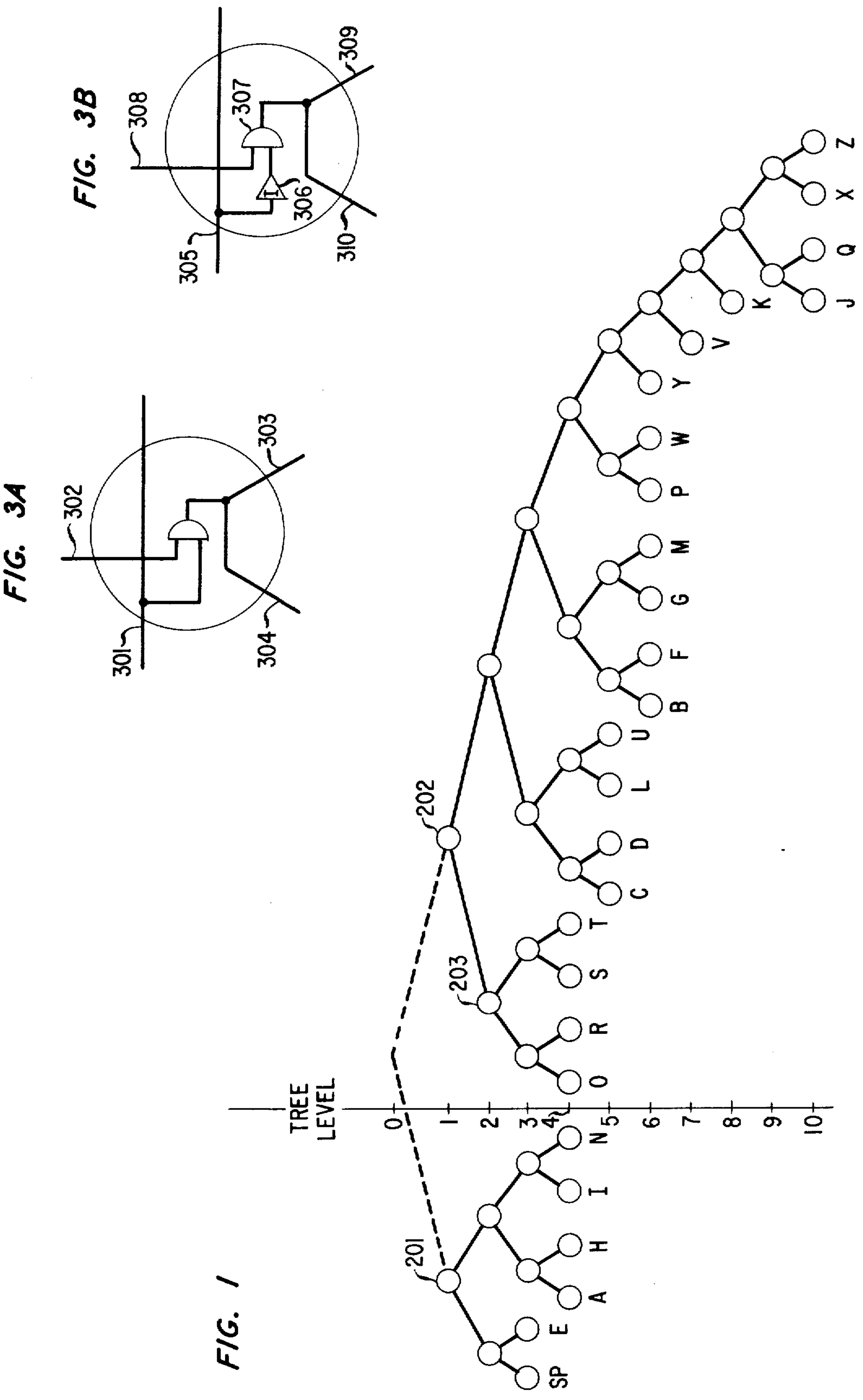
FIG. 1 shows a tree structure representation of a Huffman code for the English alphabet, including the "space."
FIGS. 3A and 3B are circuit representations of the modules used in the array of FIG. 2.

FIG. 1 shows a typical tree structure generated in accordance with the teachings of the Huffman paper cited above. See also D. A. Bell, *Information Theory and its Engineering Applications* (Third Ed.), Pitman, New Yrok, 1962, especially pp. 69–73. Table I shows the letters of The English alphabet and their corresponding Huffman Code representations. In Table I the leftmost (most significant) digit position corresponds to the level 1 nodes in FIG. 1. That is, starting at the (hypothetical) level O and examining the first digit one would normally proceeed to the lower left, i.e., node 201 in FIG. 1, if the first digit were a 0. If the first digit were a 1, however, position node 202 would be selected. Then, starting at whatever node was dictated by the first input bit, a transfer to the second level would be accomplished.

TABLE I

HUFFMAN CODES FOR LETTERS OF ENGLISH ALPHABET AND SPACE

| Decoded Value | Codeword |
|---|---|
| Space | 000 |
| E | 001 |
| A | 0100 |
| H | 0101 |
| I | 0110 |
| N | 0111 |
| O | 1000 |
| R | 1001 |
| S | 1010 |
| T | 1011 |
| C | 11000 |
| D | 11001 |
| L | 11010 |
| U | 11011 |
| B | 111000 |
| F | 111001 |
| G | 111010 |
| M | 111011 |

TABLE I-continued

HUFFMAN CODES FOR LETTERS OF ENGLISH ALPHABET AND SPACE

| Decoded Value | Codeword |
|---|---|
| P | 111100 |
| W | 111101 |
| Y | 111110 |
| V | 1111110 |
| K | 11111110 |
| J | 1111111100 |
| Q | 1111111101 |
| X | 1111111110 |
| Z | 1111111111 |

Thus for example, if the first bit had been a 1 and node 202 had been selected, followed by a 0 for the second bit, node 203 would be selected. This process is repeated until a terminal node, i.e., one from which no new paths originate, is reached. Thus, for example, in FIG. 1, if the code word 1001 is processed, a terminal node at level 4 appears which uniquely identifies the symbol R.

The above-described procedure is equivalent to techniques used in the prior art in decoding Huffman coded sequences. That is, a bit-by-bit tracing of a tree structure equivalent to that shown in FIG. 1 is accomplished. Most commonly this tracing has involved the use of multiple table references, or complex translations and sorting operations. Because of its essentially sequential nature, the decoding process is not only lengthy, but unpredictable, a priori, in length. Many systems, such as graphic display systems, rely on the presentation of a data signal at a prescribed repetitive rate. Thus some of the efficiency of Huffman coding techniques may be lost by the requirement to "pad out" each decoding interval to be equivalent to the longest allowed code word.

Figure 2:
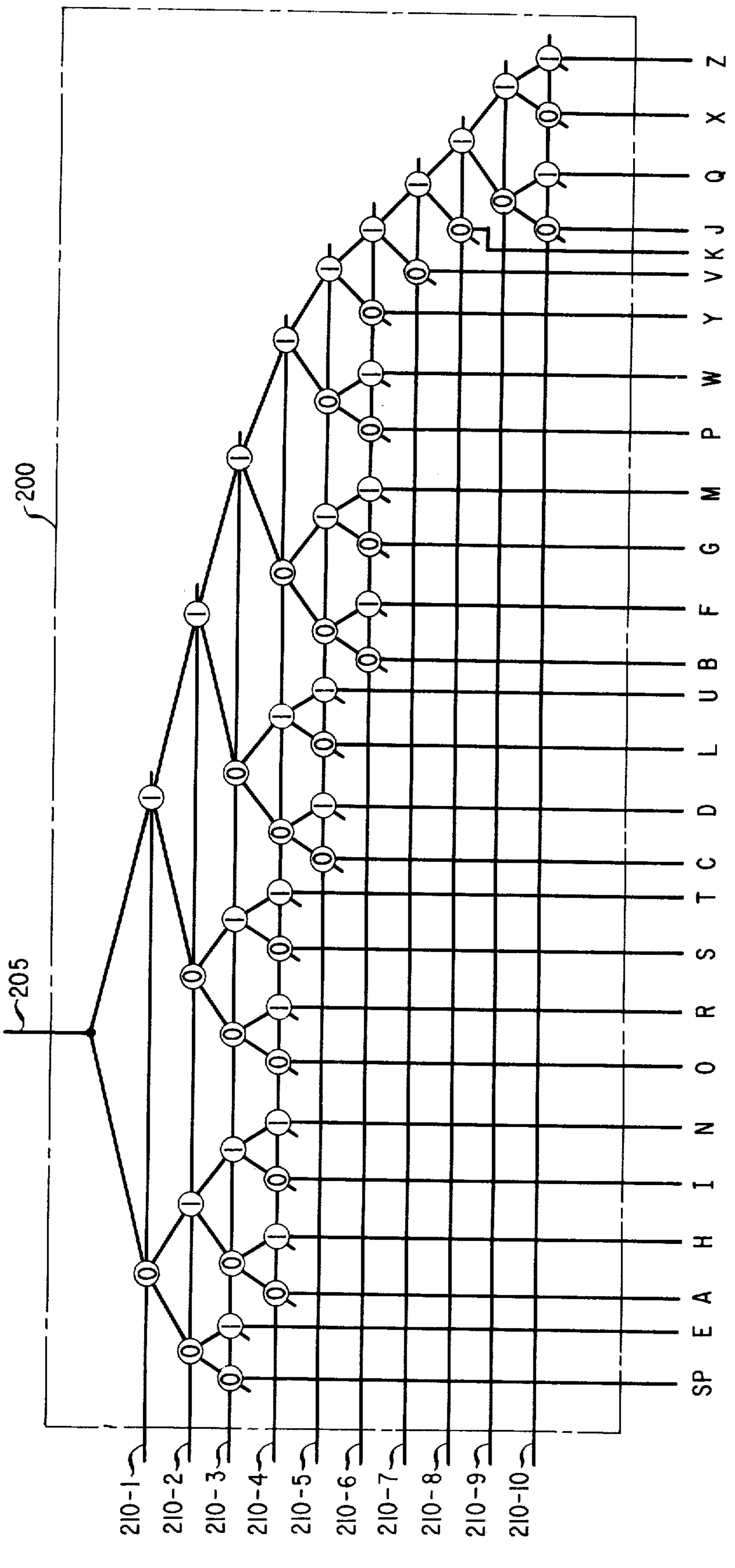
FIG. 2 shows a circuit corresponding to the tree structure in FIG. 1 for decoding variable length code words in the Huffman format.

FIG. 2 shows a representation of a circuit based on the tree structure of FIG. 1. Each of the nodes of the tree in FIG. 1 is replaced by a detection circuit which assumes either of two forms. Those circuits denoted in the circles at the node positions in FIG. 2 by a 0 are circuits capable of detecting the presence on an input lead from the left of a 0. Similarly, those circuit elements located at the node positions indicated by a circle containing a 1 are capable of detecting the presence of a 1 on the left input lead. Thus the array of FIG. 2 comprises an interconnection pattern of 1-detector and 0-detector circuits. Although they are shown in obvious positional relation to the nodes in FIG. 1, it should be clear that from a circuit point of view it is the interconnecting paths that are important rather than the geometric position of the detector circuits. The input leads 210-1 through 210-10 correspond to bit positions for the maximum code word length use to encode the symbols of the English alphabet, including the space, i.e., the symbols of Table I.

By impressing bit signals for a prefix code on the leads 210-$i$, $i = 1, \ldots, k$; $k \leq 10$, one and only one output will be realized at the bottom of FIG. 2. For example, if a pattern of all 1s were applied on the leads 210-1 through 210-10, then only the output lead designated in FIG. 2 by the lead Z would be activated. All other output leads along the bottom of the array 200 in FIG. 2 would be inactive. It proves convenient to identify the one of 27 outputs activated by an input code word by applying a pulse signal on lead 205 in FIG. 2. Then, depending upon the pattern of 1-detectors and O-detectors activated by the input signals on leads 210-i, the pulse on 205 will pass through one, and only one, complete path terminating at the bottom of the circuit in FIG. 2. Thus, for example, if the pulse is applied on lead 205 and all 1s are detected on the leads 210-1 through 210-10, then this pulse will appear as an output on the lead designated Z at the bottom of FIG. 2. This output, of course, indicates that the code applied on the input leads 210-i was that corresponding to a Z.

If, instead of the maximum code length word representing a Z, the pattern 001, followed by an arbitrary pattern of 7 more bits, is applied to respective leads 210-1 through 210-10, it should be clear that a pulse applied on lead 205 will appear on output lead E at the bottom in FIG. 2. Only the first 3 bits, 001, are operative in determining which of the 27 outputs at the bottom of FIG. 2 will be selected. The remaining 7 bits will, in general, correspond to bits from a following code group, and will bear no relation to the presently processed code word for E.

FIGS. 3A and 3B, respectively, show typical embodiments for the 1-detector and 0-detectors used in the array of FIG. 2. The essential circuit element in FIG. 3A and 3B is, of course, a switch in the form of a 2-input AND gate. If a 1 signal appears on input lead 301 in FIG. 3A, for example, and a positive pulse is applied on input lead 302, then a pulse output also appears on lead 303 and lead 304, the latter 2 leads being routinely connected together. The input on lead 301 is also conveniently fed through to other modules associated with the same level in the corresponding tree of FIG. 1. FIG. 3B, of course, operates in essentially the same manner as that of FIG. 3A in detecting the presence of a 0 on lead 305. An inversion is accomplished in inverter circuit 306 before applying the input bit signal on lead 305 to AND gate 307. Thus if a 0 appears on lead 305 and a positive pulse on lead 308, a corresponding positive pulse appears on leads 309 and 310.

Figure 4:
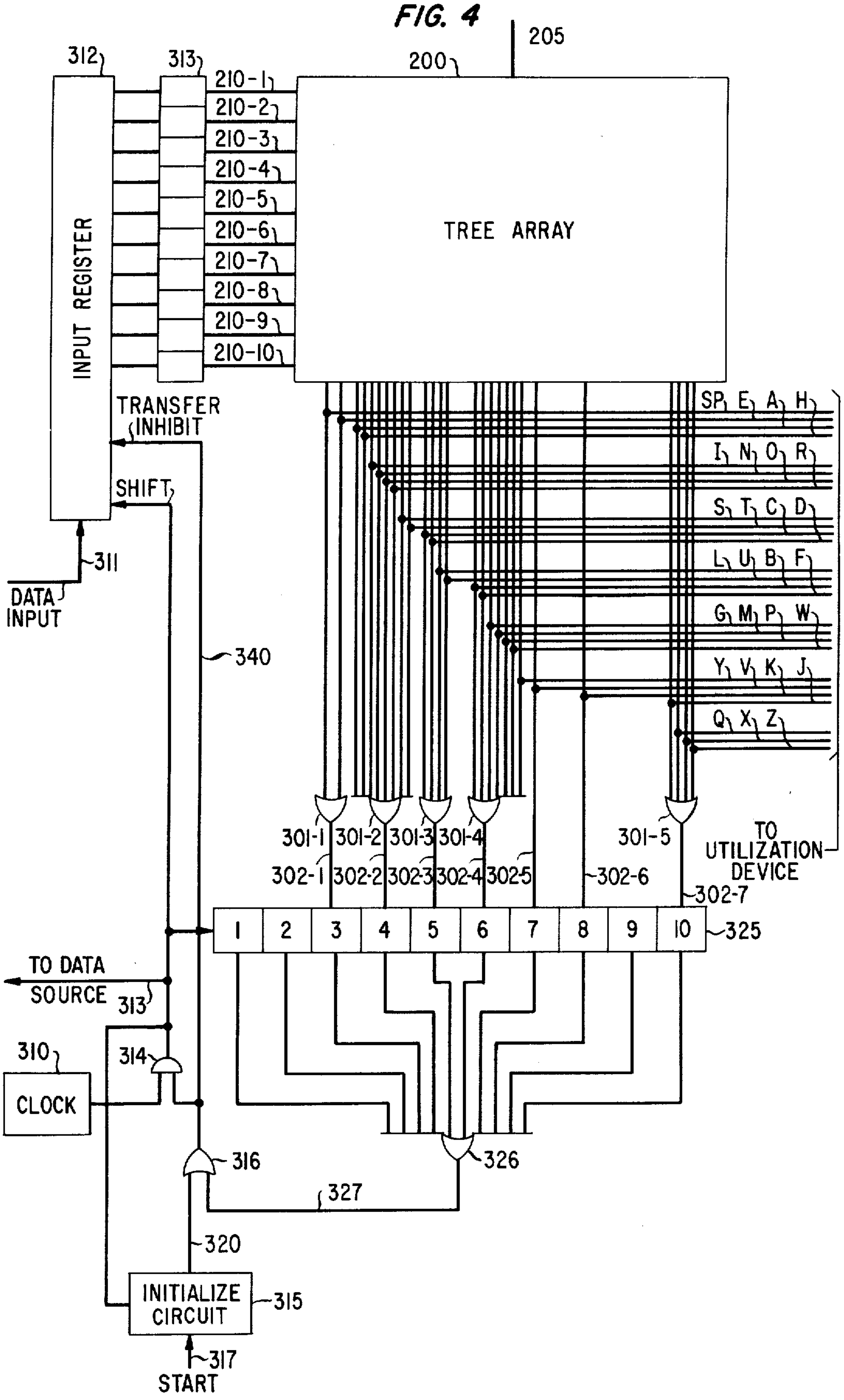
FIG. 4 is an overall system diagram employing the array of FIG. 2 for continuous decoding the butted variable-length prefix code words.

FIG. 4 shows the overall arrangement of a system for detecting the code words shown in Table I to derive the corresponding decoded symbols. Tree array 200 is that shown in FIG. 2 with input leads 210-1 through 210-10 entering at the left. Output leads identified at the bottom in FIG. 2 by the letters of the alphabet including the space, are the same outputs shown as outputs from the bottom of array 205. To eliminate crowding in FIG. 4, each lead has been explicitly identified only as brought out to the right of FIG. 4. It should be recognized, however, that the order of output leads from the bottom of array 200, in a left-to-right reading, is the same as that indicated in FIG. 2.

The outputs from the array 200 in FIG. 4 are also shown to be grouped according to the row at which the associated terminal node appears. Thus, for example, the leftmost two outputs from the tree array 200 in FIG. 4 correspond respectively to the space and E. Since each of these output leads derives from a terminal node appearing in row 3 of the array of FIG. 2, they are connected to the same OR gate 301-1 in FIG. 4. Similarly, those outputs deriving from the 4th row of the array 200, viz., A, H, I, N, O, R, S, and T, are shown applied to OR gate 301-2. This pattern is repeated for connections to other gates 301-J, $J = 1,2 \ldots, 5$. Since only one output symbol, V, derives from level 7 in the circuit 200 and only one symbol, K, derives from level 8 in the array 200, no such OR circuit is required. The leads 302-J, $J = 1,2 \ldots, 7$, therefore indicate, when they bear a pulse corresponding to that applied on lead 205, that a symbol of length 3, 4, 5, 6, 7, 8 or 10, respectively, has been decoded. Thus the array 200 together with the OR gates 301-I generate the essential information necessary to decode a Huffman minimum-redundancy or other prefix code exactly. The manner in which such an array may be utilized to operate on a continuing bit stream will now be described in further detail in connection with FIG. 4.

Clock circuit 310 is arranged to generate clock signals at a convenient rate compatible with sequential input data. These data are applied at lead 311 with each code word butted to the one before it, and each code word arranged in most-significant-bit first order. These data are shifted into input register 312 in response to clock signals delivered to the data source on lead 313. Clock signals on lead 313 are derived by way of clock circuit 310 and AND gate 314 as enabled by a signal from initialization circuit 315 and OR gate 316. Initialization circuit 315 is, in turn, responsive to a user-supplied signal on start lead 317. Thus, when the user signals an indication that data should be sent to the array 200 to be decoded, initialization circuit 315 applies a 1 indication on lead 320 to enable clock signals originating at clock circuit 310 to be gated through AND gate 314 to the data source on lead 313. Initialization circuit 315 advantageously includes a flip-flop responsive to the start signal for maintaining the 1 signal on lead 320 as required.

Input register 312 is advantageously arranged to include a number of bits, N, greater than the maximum code word length, e.g., greater than 10 for the code words of Table I. When the first bit of the first code word reaches the top of the register 312, the contents of the first 10 bits are transferred in parallel to register 313. This is accomplished, in part, by including in initialization circuit 315 a counter responsive to clock signals applied to it concurrently with those supplied to data source 313. Thus when a number of pulses equal to the bit length, N, of shift register 312 is applied to lead 313 and, therefore, initialization circuit 315, the count N is registered. This count is used to reset the flip-flop in initialization circuit 315 to remove the 1 condition on lead 320. The removal of the 1 signal on lead 320 then terminates the sequence of clock pulses passing to lead 313 and, as shift pulses, to register 312. This removal also serves to remove the transfer inhibit signal on lead 340, thereby permitting a parallel transfer of data from the first 10 bit positions of register 313. From there, these 10 bit signals are applied in obvious fashion to the tree array 200. An appropriately timed pulse applied on lead 205 is thereafter used to derive a pulse on an appropriate one of the output leads at the right of FIG. 4. Thus the decoding of the first symbol has been accomplished.

Simultaneously, one of the OR gates 301-I (or one of the leads 302-5 or 302-6) receives the code-word-length-indicating signal. This signal is advantageously applied to a respective one of the bit positions of 10-bit shift register 325. OR gate 326 detects the presence of a 1 bit in any one of the bit positions of shift register 325. The output of OR gate 326 on lead 327 is then used to again gate clock signals from clock 310 at AND gate 314. The effect of this gating, then, is to supply additional clock signals on lead 313 to the data source, thereby causing additional input data bits to be supplied on lead 311. These clock signals on lead 313 are also supplied as shift pulses to shift registers, 325 and 312. When shift register 325 has been pulsed a sufficient number of times to cause an entered bit to be shifted leftward from the first (leftmost) bit position, thereby causing all 0s to be present in register 325, the output on lead 327 assumes the 0 condition and AND gate 314 is again disabled. This causes the clock pulses on lead 313 to terminate. It will be noted, however, that exactly the right number of pulses, indicative of the length of the last-decoded code word, will have been sent to data source 313 and input register 312 to exactly replace the number of digits in the preceding code word. Further, the next code word will be positioned in register 312 with its most significant bit in the topmost bit position so that the entire decoding process may be repeated.

It should be understood that the particular lengths given above for the various code words and registers, or the code words themselves, are in no way fundamental to the present invention. Other prefix codes than Huffman codes, other symbol alphabets than the English alphabet, with space, and other detailed arrangements for deriving data and timing signals will be found to be useful by those skilled in the arts in practicing the present invention. Although the clock signals supplied on lead 313 are shown as applied to the data source directly, and data on lead 311 is indicated as deriving from this source, it will be clear to those skilled in the art that in appropriate cases, synchrous data sources, varying speeds of operation, and available register lengths, among other factors, dictate that standard buffering techniques will be used to interface with the circuitry of FIG. 4. Similar considerations may dictate buffering between the output leads and an appropriate utilization device. Similarly, though binary digits and code words are shown, and binary circuit elements used above, it should be clear that the present techniques are applicable to other than binary systems.

While a specially constructed tree network is shown in FIG. 2, it should be understood that a tree less tailored to the particular code may be used. Thus if a more "general purpose" tree, i.e., a more complete tree having $2^i$ modes at the ith level, $i = 1,2 \ldots, M$, is available, the outputs deriving from a node indicated in FIGS. 1 and 2 to correspond to an output symbol may be rendered inactive by standard array programming techniques. Alternatively, the terminal nodes, at the Mth level, which derives from these output-symbol nodes may be logically ORed to effectively constitute them as one node.

What is claimed is:

1. Apparatus for decoding an input sequence of butted, variable-length prefix code words having a maximum of M digits to derive the corresponding ones of symbols from an output alphabet comprising A. a tree decoding network in which each tree level corresponds uniquely to one of M digit positions, said tree comprising a terminal node for each symbol in said output alphabet, B. means for simultaneously applying M digits from said input sequence to said tree network, each digit being applied to a respective row of said tree, C. first means for detecting which terminal node of said tree has been selected by said M digits, (D) second means for determining the level of said tree at which said terminal node has been selected by said M digits, and (E) third means responsive to said second means for determining the beginning point in said input sequence of the code word immediately following the code word beginning with the first of said M digits.

2. Apparatus according to claim 1 wherein said second means comprises a plurality of OR gates each arranged to OR output indications from all terminal nodes at a respective level of said tree network.

3. Apparatus according to claim 1 wherein said tree decoding network comprises means for connecting the input digit signal at any tree level to all nodes at that tree level.

4. Apparatus according to claim 1 wherein said tree network comprises at each level a plurality of bit detectors for detecting the presence in said input digit signal of either a 1 or a 0, and for controlling the branching to succeeding nodes, if any, based on said detection.

5. Apparatus according to claim 1 wherein said third means comprises means for storing a numerical count of said level determined by said second means, means for simultaneously decrementing said count and advancing said input data sequence, means for terminating said advancing when said count is decremented to a predetermined value, and means for applying an additional set of M digits from the input sequence to said decoding network when said predetermined value is reached.

* * * * *